(12) United States Patent
Jones et al.

(10) Patent No.: US 10,524,095 B2
(45) Date of Patent: *Dec. 31, 2019

(54) CHECKPOINT-BASED LOCATION MONITORING VIA A MOBILE DEVICE

(71) Applicant: Honeywell International Inc., Morris Plains, NJ (US)

(72) Inventors: Bryan Jones, Muswellbrook (AU); Sanjay Roy, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,461

(22) Filed: Aug. 13, 2018

(65) Prior Publication Data

US 2019/0007799 A1 Jan. 3, 2019

Related U.S. Application Data

(63) Continuation of application No. 15/356,357, filed on Nov. 18, 2016, now Pat. No. 10,051,429.

(51) Int. Cl.
*H04W 24/00* (2009.01)
*H04W 4/029* (2018.01)
(Continued)

(52) U.S. Cl.
CPC .......... *H04W 4/029* (2018.02); *H04W 40/244* (2013.01); *H04W 88/02* (2013.01)

(58) Field of Classification Search
CPC combination set(s) only.
See application file for complete search history.

(56) References Cited

U.S. PATENT DOCUMENTS

| 4,672,654 A | 6/1987 | Vanacore |
| 7,969,302 B2 | 6/2011 | Srinivasa et al. |

(Continued)

FOREIGN PATENT DOCUMENTS

| CN | 104144497 A | 11/2014 |
| EP | 2085934 A1 | 8/2009 |

OTHER PUBLICATIONS

Fave, et al. "Game-theoretic Security Patrolling with Dynamic Execution Uncertainty and a Case Study on a Real Transit System", Journal of Artificial Intelligence Research 50, Jun. 2014, 47 pp.

(Continued)

*Primary Examiner* — Justin Y Lee
(74) *Attorney, Agent, or Firm* — Brooks, Cameron & Huebsch, PLLC

(57) ABSTRACT

Systems, devices, and methods for checkpoint-based location monitoring via a mobile device are described herein. One device includes instructions stored thereon executable by a processor to receive, via a mobile device associated with a user in a facility having a plurality of wireless beacons therein, an indication of a first checkpoint corresponding to a first location in the facility and a first time period in which the user is allowed to reach the first checkpoint, provide to the user, via the mobile device, the indication of the first checkpoint and the first time period allowed to reach the first checkpoint, determine that the mobile device reached the first checkpoint based on a communication between the mobile device and a wireless beacon associated with the first checkpoint, receive, via the mobile device subsequent to the determination, an indication of a second checkpoint corresponding to a second location in the facility and a second time period in which the user is allowed to reach the second checkpoint, and provide to the user, via the mobile device, the indication of the second (Continued)

checkpoint and the second time period in which the user is allowed to reach the second checkpoint.

18 Claims, 5 Drawing Sheets

(51) Int. Cl.
*H04W 40/24* (2009.01)
*H04W 88/02* (2009.01)

(56) References Cited

U.S. PATENT DOCUMENTS

| | | | |
|---|---|---|---|
| 9,058,702 | B2 | 6/2015 | Chao et al. |
| 9,076,273 | B2 | 7/2015 | Smith et al. |
| 2006/0208857 | A1 | 9/2006 | Wong |
| 2009/0249433 | A1 | 10/2009 | Misra et al. |
| 2011/0291798 | A1 | 12/2011 | Schibuk |
| 2014/0049361 | A1 | 2/2014 | Ahearn et al. |
| 2014/0342667 | A1 | 11/2014 | Aarnio |
| 2014/0375421 | A1 | 12/2014 | Morrison et al. |
| 2015/0035645 | A1 | 2/2015 | Gaddam et al. |
| 2015/0050950 | A1 | 2/2015 | Alon et al. |
| 2015/0296480 | A1 | 10/2015 | Kinsey et al. |
| 2017/0280322 | A1 | 9/2017 | Roy et al. |

OTHER PUBLICATIONS

Logosoft brings lone worker supervision into the Android era, http://www.securitynewsdesk.com/logosoft-brings-lone-worker-supervision-android-era/, May 29, 2014, 7 pp.
Sookman "Smartphones are Key to the Future of Security", https://www.guardly.com/blog/2015/02/04/smartphones-are-key-to-the-future-of-security/index.html, Feb. 4, 2015, 5 pp.
Bobescu, et al., "Mobile indoor positioning using wi-fi localization", Review of the Air Force Academy, 2015, No. 1 (28), 4 pp.
Bhargava, et al., "Physical Authentication through Localization in Wireless Local Area Networks", Global Telecommunications Conference, GLOBECOM '05 IEEE, Jan. 23, 2006, 5 pp.
"Passive Entry Door System with Proximity Sensor", http://www.atmel.com/Images/Atmel-42582-Passive-Entry-Door-System-with-Proximity-Sensor_Application%20Note_AT12649.pdf, Nov. 2015, 22 pp.
Bellido-Outeirño, "Universal Bluetooth™ Access Control and Security System", International Journal on Advances in Security, 2011, vol. 4 No. 3 and 4, 10 pp.

CHECKPOINT-BASED LOCATION MONITORING VIA A MOBILE DEVICE

PRIORITY INFORMATION

This application is a continuation of U.S. patent application Ser. No. 15/356,357, filed Nov. 18, 2016, which is incorporated herein by reference in its entirety.

TECHNICAL FIELD

The present disclosure relates to systems, devices, and methods for checkpoint-based location monitoring via a mobile device.

BACKGROUND

Security guards routinely patrol facilities. These patrols may be done as both a surveillance and a general deterrence activity. A patrol may include a "tour" around different locations of a facility.

Previous approaches to security touring may include a wand carried by the guard tapped against some electronic device corresponding to a "checkpoint" in order to verify that the guard was there. The resulting data can then later be downloaded from the wand by a supervisory entity to verify that the tour did in fact take place, that all the checkpoints were reached, and that they were reached at the correct time(s).

However, previous approaches do not maintain a dynamic communication link between the guard and the supervisory entity. In addition, such approaches may be predictable and/or easily spoofed.

DETAILED DESCRIPTION

Figure 1A:
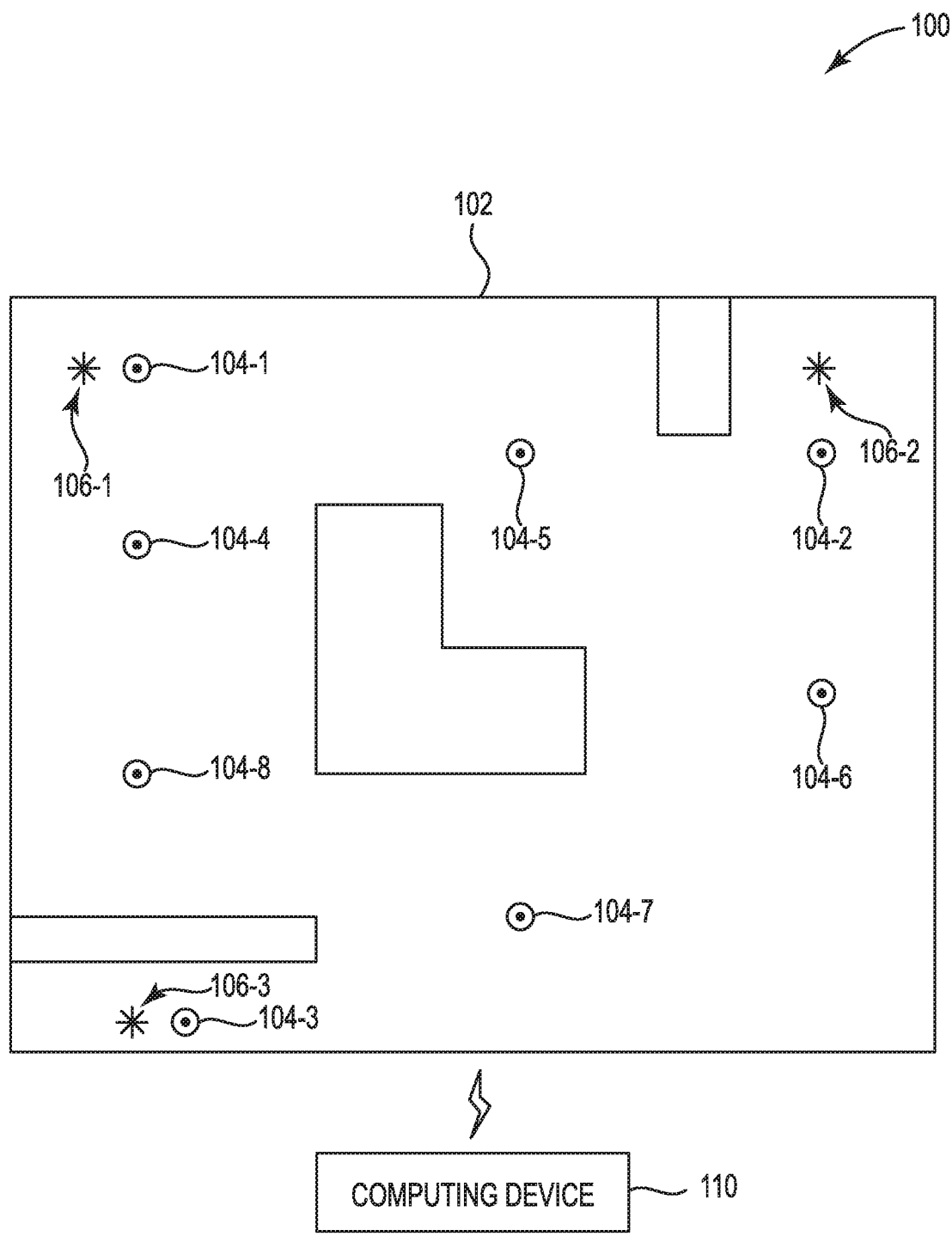
FIG. 1A illustrates a system for checkpoint-based location monitoring via a mobile device in accordance with one or more embodiments of the present disclosure.

Checkpoint-based location monitoring via a mobile device is described herein. For example, one or more embodiments include a computer-readable medium having instructions stored thereon executable by a processor to receive, via a mobile device associated with a user in a facility having a plurality of wireless beacons therein, an indication of a first checkpoint corresponding to a first location in the facility and a first time period in which the user is allowed to reach the first checkpoint, provide to the user, via the mobile device, the indication of the first checkpoint and the first time period allowed to reach the first checkpoint, determine that the mobile device reached the first checkpoint based on a communication between the mobile device and a wireless beacon associated with the first checkpoint, receive, via the mobile device subsequent to the determination, an indication of a second checkpoint corresponding to a second location in the facility and a second time period in which the user is allowed to reach the second checkpoint, and provide to the user, via the mobile device, the indication of the second checkpoint and the second time period in which the user is allowed to reach the second checkpoint.

Embodiments of the present disclosure can effectively replace a user-carried guard wand with a mobile device (a mobile computing device). By using a mobile device—something most users typically already carry—embodiments of the present disclosure can provide increased security compared to previous approaches.

Increased security can be provided through capabilities offered by mobile devices. In some embodiments, biometric validation (e.g., fingerprint scanning, voice identification) can be carried out via the mobile device. Accordingly, whereas in previous approaches an attacker could overpower a guard, steal his wand, and tap it on the next checkpoint, embodiments herein can prevent such attacks.

Embodiments of the present disclosure can dynamically determine where to send a guard next once he reaches a checkpoint. Because this determination is made on the fly, embodiments herein are less predictable than previous approaches. A guard's habits are much more difficult to study and use against him when his route throughout a facility changes dynamically.

While the specific example of a security guard performing a security patrol and/or tour of a facility is described herein, embodiments of the present disclosure are not so limited. Checkpoints, as described herein, are not limited to security checkpoints. Similarly, users of embodiments of the present disclosure are not limited to security guards.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

FIG. 1A illustrates a system 100 for checkpoint-based location monitoring via a mobile device in accordance with one or more embodiments of the present disclosure. As shown in FIG. 1, system 100 includes a plurality of beacons in a facility 102. Eight beacons are illustrated in FIG. 1A, though it is noted embodiments of the present disclosure are not limited to a particular number of beacons. The beacons include a beacon 104-1, a beacon 104-2, a beacon 104-3, a beacon 104-4, a beacon 104-5, a beacon 104-6, a beacon 104-7, and a beacon 104-8, and are cumulatively referred to herein as "beacons 104."

The beacons 104 can be devices capable of wireless communication with a mobile device. The beacons 106 can allow the determination of a location of a mobile device in the facility 102. For example, the beacons 104 can allow the determination of whether a mobile device is within a particular (e.g., threshold) distance of a checkpoint (discussed further below). The beacons 104 can communicate with a mobile device via Bluetooth Low Energy (BLE) technology (e.g., as an iBeacon), WiFi, etc. In some embodiments, the beacons 104 can include one or more readable tags (e.g., near field communication (NFC)) tags.

A facility, as used herein, can refer to one or more buildings, businesses, homes, plants, hospitals, refineries, etc. The facility 102 can include indoor and/or outdoor areas. Areas of the facility 102 can include a room, a plurality of rooms, a wing, a building, a plurality of buildings, an installation, etc. In some embodiments, areas of the facility 102 can be defined by physical boundaries (e.g., walls, doors, etc.). In some embodiments, areas can be defined by logical and/or geographic boundaries. Areas of the facility 102 can be defined by a user and/or by a Building Information Model (BIM) associated with the facility 102, for instance.

The facility can include a plurality of checkpoints. As shown in FIG. 1, the facility 102 includes three checkpoints: a checkpoint 106-1, a checkpoint 106-2, and a checkpoint 106-3 (cumulatively referred to as "checkpoints 106"). It is noted that embodiments of the present disclosure are not limited to a particular number of checkpoints. The checkpoints 106 can correspond to locations in the facility 102 that a security guard (hereinafter "guard") is to reach during a tour (e.g., security patrol) of the facility 102. The checkpoints can correspond to doors, windows, areas, rooms, etc. of the facility 102.

Each of the checkpoints 106 can have one or more of the beacons 104 associated with it. For instance, the checkpoint 106-1 is associated with the beacon 104-1, the checkpoint 106-2 is associated with the beacon 104-2, and the checkpoint 106-3 is associated with the beacon 104-3. The associated beacons can be located proximal to the checkpoints (e.g., within a particular distance of the checkpoints).

The system 100 includes a computing device 110, which can include a processor and a memory as described below in connection with FIG. 2. The computing device 110 can control (e.g., manage) checkpoint-based location monitoring in accordance with one or more embodiments herein. Though in the example illustrated in FIG. 1 the computing device 110 is shown external to the facility 102 (e.g., remote with respect to the facility 102), embodiments of the present disclosure are not so limited. In some embodiments, the computing device 110 is internal to the facility 102 (e.g., local with respect to the facility 102). In some embodiments, the computing device 110 can be cloud-based.

Figure 1B:
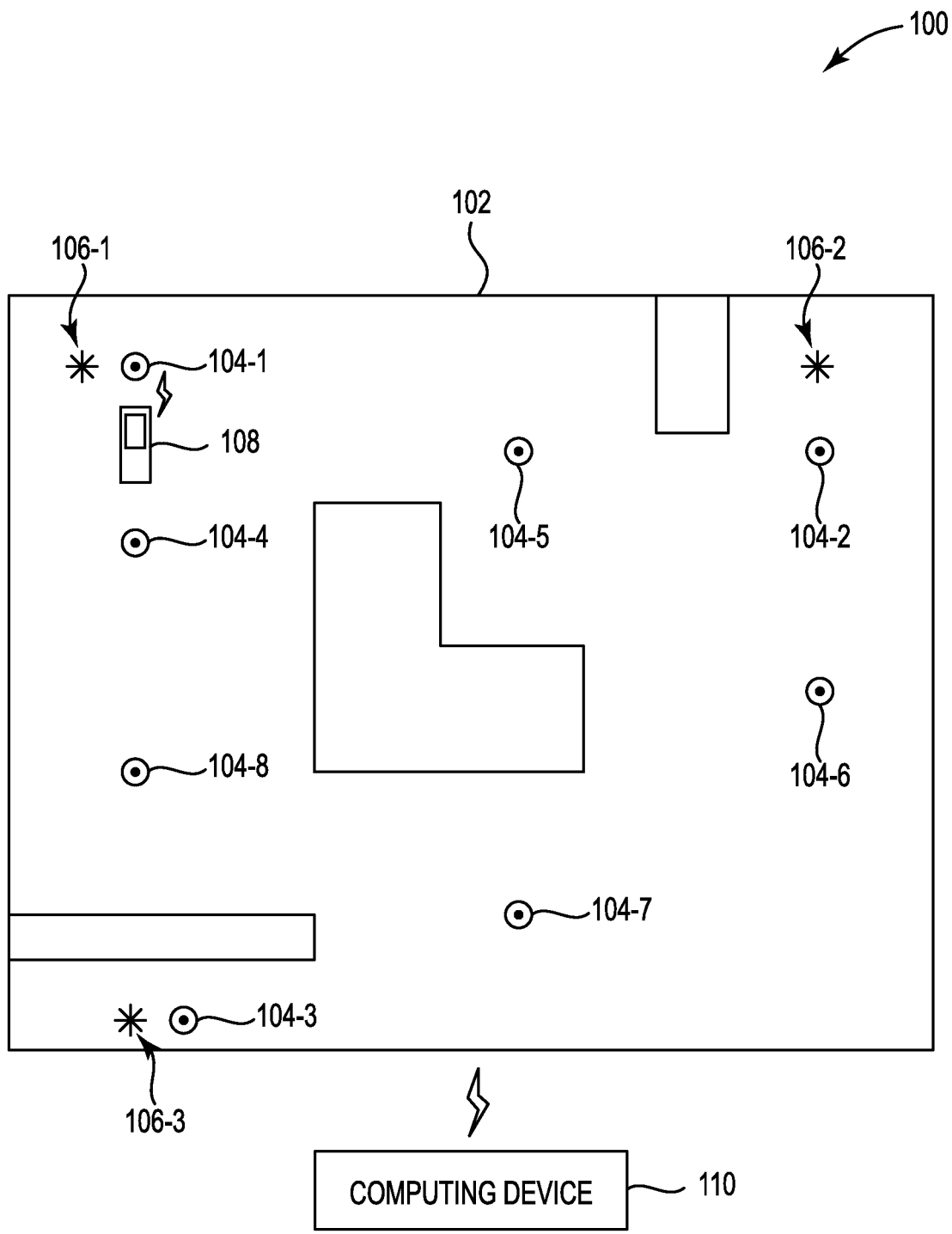
FIG. 1B illustrates the system for checkpoint-based location monitoring via a mobile device wherein a mobile device is located at a first checkpoint in accordance with one or more embodiments of the present disclosure.
Figure 1C:
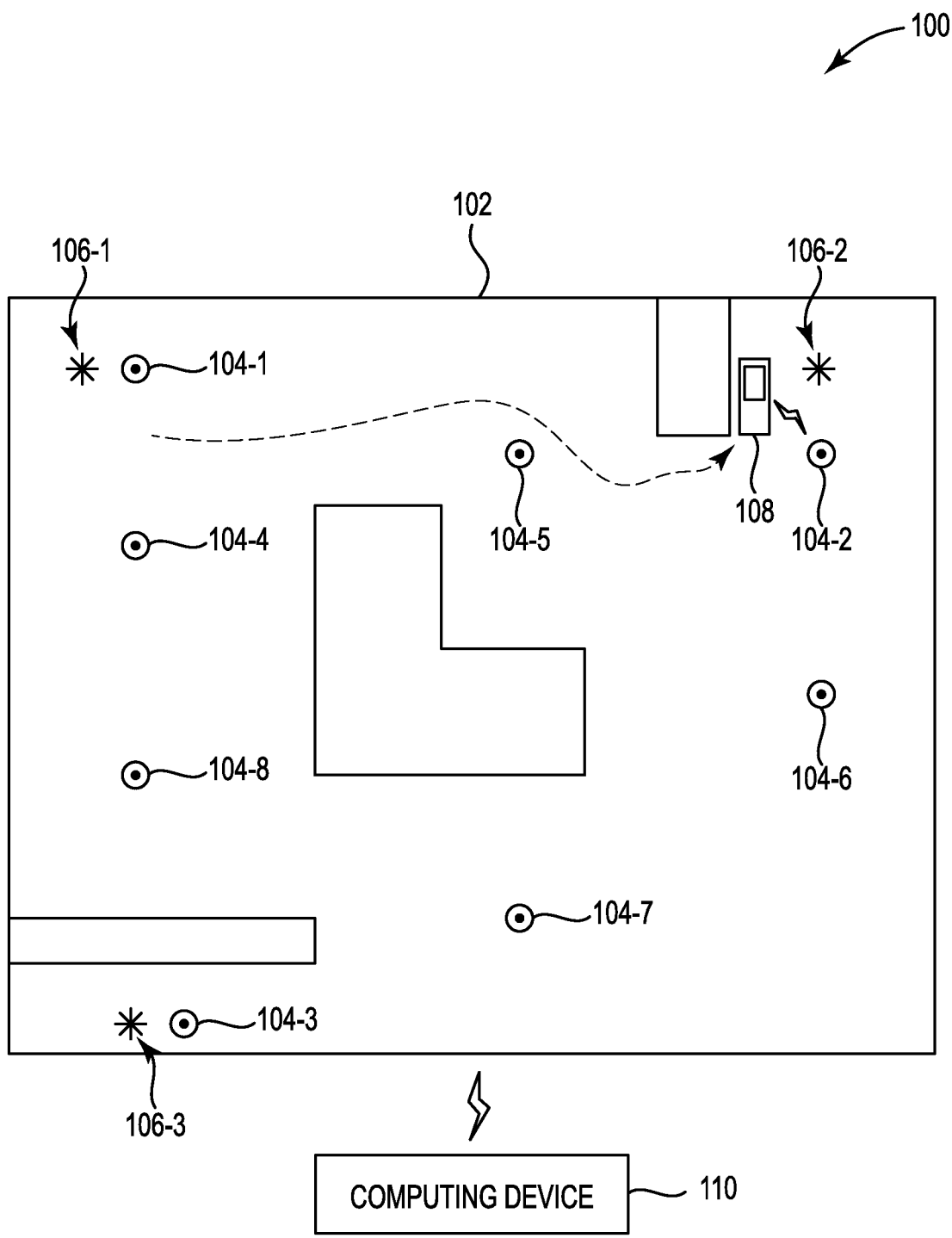
FIG. 1C illustrates the system for checkpoint-based location monitoring via a mobile device wherein the mobile device is located at a second checkpoint in accordance with one or more embodiments of the present disclosure.

FIG. 1B illustrates the system 100 for checkpoint-based location monitoring via a mobile device wherein a mobile device 108 is located at a first checkpoint in accordance with one or more embodiments of the present disclosure. The mobile device 108 can be associated with a guard. In some embodiments, the mobile device 108 can be assigned and/or otherwise provided to the guard.

The mobile device 108 can be a client device carried or worn by a user. For example, the mobile device 108 can be a phone (e.g., smart phone), personal digital assistant (PDA), tablet, and/or wearable device (e.g., wristband, watch, necklace, etc.).

The mobile device 108 can include one or more software applications (e.g., apps) which can define and/or control communications between the mobile device 108, the computing device 110, and/or other devices. Apps may be received by the mobile device 108 from the computing device 110, for instance. Apps may be launched by a user and/or responsive to some other condition (e.g., the interaction between the mobile device 108 and a beacon (discussed below)). In some embodiments, apps can be executing as background apps.

The mobile device 102 can communicate with (e.g., exchange data with) the computing device 110 via a wired and/or wireless connection, for instance. In some embodiments, the mobile device 108 can communicate using one or more communications modules (e.g., cellular, WiFi, etc.). Communication between various devices herein can be carried out over a wireless network. A wireless network, as used herein, can include WiFi, Bluetooth, or any other suitable means to wirelessly transmit and/or receive information.

The mobile device 108 can include a location functionality configured to determine a location of the mobile device. In some embodiments, the location functionality includes a GPS and/or WiFi functionality of the mobile device 108, though embodiments of the present disclosure are not so limited. For example, the mobile device 108 can include an imaging functionality (e.g., a camera) which can be used to read a code at a particular (e.g., known) location in the facility 102. In some embodiments, the mobile device 108 can utilize visual light communication (VLC) techniques to determine its position in the facility 102.

Embodiments of the present disclosure can track a location of the mobile device 108 in the facility 102. As discussed further below, the mobile device 108 can be associated with a guard. In some embodiments, tracking the location can include receiving location information by the computing device 110. The location information can be provided as a particular geographic location (e.g., latitude/longitude) and/or a location with respect to another location, such as an area of a facility 102 or one or more of the beacons 104 of the facility 102. In some embodiments, location information can be communicated from the mobile device 108, and thus received by the computing device 110, responsive to a communication being established between the mobile device 108 and one or more of the beacons 104.

In some embodiments, an indication that the mobile device 108 is within a particular distance of one of the checkpoints 106 can be received responsive to a communication between the mobile device 108 and one of the beacons 104 associated with that checkpoint. For instance, an indication that the mobile device 108 is within a particular distance of the first checkpoint 106-1 can be received responsive to a communication between the mobile device 108 and the beacon 104-1.

The mobile device 108 can receive an indication (e.g., from the computing device 110) associated with the first checkpoint 106-1 and a first time period allowed to reach the first checkpoint 106-1. The mobile device 108 can provide to the guard (e.g., via a display of the mobile device) the indication of the first checkpoint 106-1 and the first time period allowed to reach the first checkpoint 106-1. Once the guard reaches the first checkpoint 106-1, a communication between the first beacon 106-1 can inform the computing device 110 of his arrival. That is, a determination can be made that the mobile device 108 reached the first checkpoint 106-1 based on a communication between the mobile device 108 and the beacon 104-1 associated with the first checkpoint 106-1.

Responsive to the determination that the guard reached the first checkpoint 106-1, the mobile device 108 can be configured to receive a verification that the mobile device 108 is possessed by the guard. Such a verification can include a biometric input, for instance, and/or the entry of a password. Verifications including biometric inputs in accordance with embodiments herein can include fingerprint verifications and/or voice identification verifications, though the present disclosure is not so limited.

Subsequent to that determination, a second checkpoint to which to send the guard can be determined by the computing device 110. In addition, a second time period allowed to reach the second checkpoint can be determined. For example, the second checkpoint can be the checkpoint 106-2. An indication of the second checkpoint 106-2 and a second time period allowed to reach the second checkpoint 106-2 can be communicated to the mobile device 108. The second checkpoint 106-2 and/or the time period allowed to reach the second checkpoint 106-2 can be displayed, for instance, on the mobile device 108.

The computing device 110 can determine the second checkpoint 106-2 based on a random selection of a particular checkpoint from a subset of the plurality of checkpoints 106 in some embodiments. Such a subset can include checkpoints having a determined risk of intrusion into the facility 102 that exceeds a threshold at the time the determination is made.

As the guard makes his way from the first checkpoint 106-1 to the second checkpoint 106-2, his path can be tracked in real time using one or more of the beacons 104. As shown in FIG. 1, the path can be tracked using the beacons 104-5 and or 104-2, for instance. A notification can be provided via the mobile device 108 responsive to a determination that the second time period allowed to reach the second checkpoint 106-2 has fallen below a threshold. In some embodiments, such a notification can be provided via a particular sound played by the mobile device 108. In some embodiments, such a notification can be provided via a particular vibration pattern caused by the mobile device.

If the mobile device 108 is not determined to have reached the second checkpoint 106-2 within the second time period allowed, a notification can be provided. In some embodiments, a notification can be provided via the mobile device (e.g., to the guard). In some embodiments, a notification can be provided via the computing device 110.

A duration of the second time period allowed can be determined based on a distance between the first checkpoint 106-1 and the second checkpoint 106-2, for instance. In some embodiments, a duration of the second time period allowed can be determined based on a time period associated with a previous path taken by the guard from the first checkpoint 106-1 to the second checkpoint 106-2. In some embodiments, a duration of the second time period allowed can be different than a previous determined time period allowed for the guard to reach the second checkpoint 106-2 from the first checkpoint 106-1. In some embodiments, those time periods can be the same.

FIG. 1O illustrates the system 100 for checkpoint-based location monitoring via a mobile device wherein the mobile device 108 is located at a second checkpoint in accordance with one or more embodiments of the present disclosure. As indicated by the dotted line shown in FIG. 1O, the guard carrying the mobile device 108 has made his way to the second checkpoint 106-2. The guard's arrival at the second checkpoint 106-2 can be determined based on a communication between the mobile device 108 and the beacon 104-2 associated with the second checkpoint 106-2.

The computing device 110 can then determine a third checkpoint (e.g., checkpoint 106-3) to send the guard and a time allowed for the guard to reach the third checkpoint 106-3 in a manner analogous to determining the second checkpoint 106-2 and second time allowed, discussed above. Accordingly, the mobile device 108 can receive and provide the third checkpoint 106-3 and the third time period allowed to reach the third checkpoint responsive to the determination that the mobile device 108 reached the second checkpoint 106-2 based on the communication between the mobile device 108 and the beacon 104-2 associated with the second checkpoint 106-2.

Figure 1D:
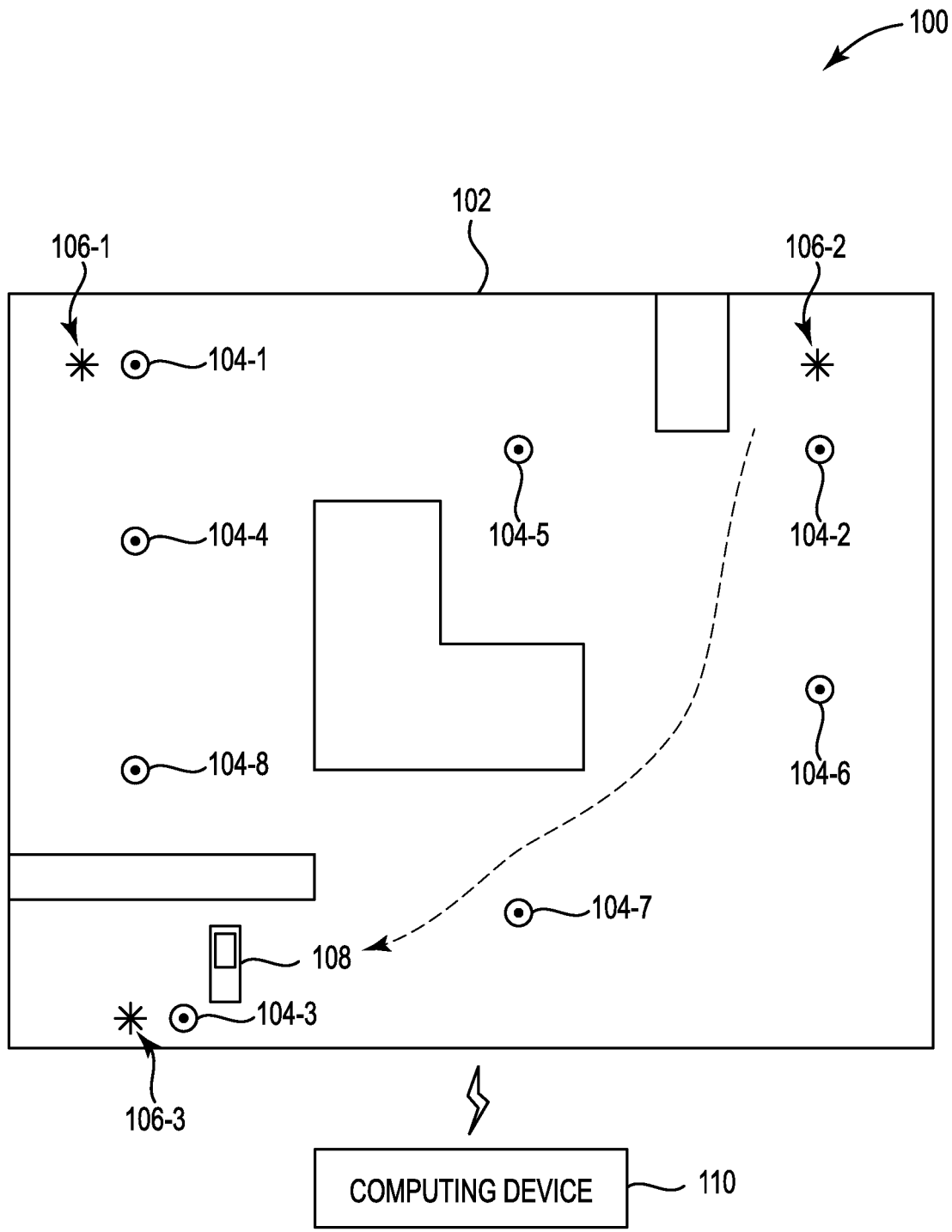
FIG. 1D illustrates the system for checkpoint-based location monitoring via a mobile device wherein the mobile device is located at a third checkpoint in accordance with one or more embodiments of the present disclosure.

FIG. 1D illustrates the system 100 for checkpoint-based location monitoring via a mobile device wherein the mobile device 108 is located at a third checkpoint 106-3 in accordance with one or more embodiments of the present disclosure. As indicated by the dotted line shown in FIG. 1D, the guard carrying the mobile device 108 has made his way to the third checkpoint 106-3. The guard's arrival at the third checkpoint 106-3 can be determined based on a communication between the mobile device 108 and the beacon 104-3 associated with the third checkpoint 106-3. The guard's path from the second checkpoint 106-2 to the third checkpoint 106-3 can be tracked in real time based on communications between the mobile device 108 and the beacons 104-6, 104-7, and 104-3, for instance.

The computing device 110 can then determine a fourth checkpoint to send the guard and a time allowed for the guard to reach the fourth checkpoint in a manner analogous that discussed above, for instance. The fourth checkpoint can be the checkpoint 106-1, the checkpoint 106-2, or some other checkpoint in the facility (not shown in FIGS. 1A-1D).

Figure 2:
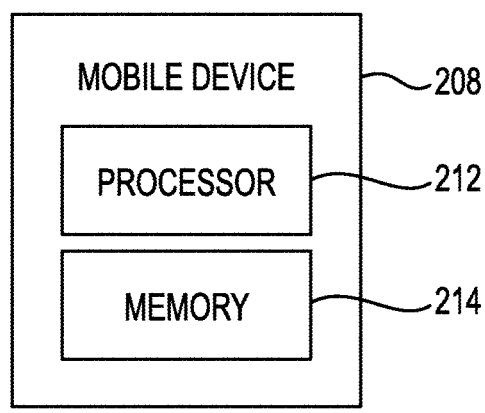
FIG. 2 illustrates a mobile device in accordance with one or more embodiments of the present disclosure.

FIG. 2 illustrates a mobile device 208 in accordance with one or more embodiments of the present disclosure. The mobile device 208 can be a computing device. The mobile device 208 can include a memory 214 and a processor 212 configured to execute executable instructions stored in the memory 214 to perform various examples of the present disclosure, for example. That is, the memory 214 can be any type of non-transitory storage medium that can be accessed by the processor 212 to perform various examples of the present disclosure. For example, the memory 214 can be a non-transitory computer readable medium having computer readable instructions (e.g., computer program instructions) stored thereon that are executable by the processor 212.

The memory 214 can be volatile or nonvolatile memory. The memory 214 can also be removable (e.g., portable) memory, or non-removable (e.g., internal) memory. For example, the memory 214 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 214 is illustrated as being located within the mobile device 102, embodiments of the present disclosure are not so limited. For example, memory 214 can also be located internal to another computing resource (e.g., enabling computer readable instructions to be downloaded over the Internet or another wired or wireless connection). In some embodiments, the memory 214 and/or the processor 212 can be located in the computing device 110, previously described in connection with FIG. 1.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon executable by a processor to:
   receive, via a mobile device associated with a user in a facility having a plurality of wireless beacons therein, an indication of a first checkpoint corresponding to a first location in the facility and a first time period in which the user is allowed to reach the first checkpoint;
   provide to the user, via the mobile device, the indication of the first checkpoint and the first time period allowed to reach the first checkpoint;
   determine that the mobile device reached the first checkpoint based on a communication between the mobile device and a wireless beacon associated with the first checkpoint;
   responsive to the determination that the mobile device reached the first checkpoint, receive, via the mobile device, an indication of a second checkpoint corresponding to a second location in the facility and a second time period in which the user is allowed to reach the second checkpoint, wherein the second checkpoint is determined based on a determined risk of intrusion into the facility proximal to the second checkpoint; and
   provide to the user, via the mobile device, the indication of the second checkpoint and the second time period in which the user is allowed to reach the second checkpoint.

2. The medium of claim 1, wherein the instructions include instructions to track a path taken by the mobile device between the first checkpoint and the second checkpoint based on communications between the mobile device and each of a subset of the plurality of beacons.

3. The medium of claim 1, wherein the instructions to provide the first time period in which the user is allowed to reach the first checkpoint include instructions to display the first time period on a display of the mobile device.

4. The medium of claim 1, wherein the instructions include instructions to provide a notification via the mobile device responsive to a determination that the mobile device did not reach the second checkpoint within the second time period.

5. The medium of claim 1, wherein the instructions include instructions to provide a notification to a computing device responsive to a determination that the mobile device did not reach the second checkpoint within the second time period.

6. The medium of claim 1, wherein the instructions include instructions to determine the second time period based on a distance between the first checkpoint and the second checkpoint.

7. The medium of claim 1, wherein the instructions include instructions to determine the second time period based on a time period associated with a previous path taken by the user from the first checkpoint to the second checkpoint.

8. The medium of claim 1, wherein the instructions include instructions to receive and provide, via the mobile device, a third checkpoint corresponding to a third location in the facility and a third time period in which the user is allowed to reach the third checkpoint responsive to a determination that the mobile device reached the second checkpoint based on a communication between the mobile device and a wireless beacon associated with the second checkpoint.

9. The medium of claim 1, wherein the instructions include instructions to receive a verification that the mobile device is possessed by the user responsive to the determination that the mobile device reached the first checkpoint.

10. The medium of claim 9, wherein the verification is a biometric input.

11. A system for checkpoint-based location monitoring via a mobile device, comprising:
    a plurality of beacons in a facility, wherein each of the plurality of beacons corresponds to a respective security checkpoint of a plurality of security checkpoints of the facility;
    a mobile device associated with a user of the facility, wherein the mobile device is configured to communicate with each of the plurality of beacons; and
    a computing device, configured to:
      determine that the mobile device has reached a first checkpoint of the plurality of checkpoints of the facility based on a communication with a beacon of the plurality of beacons corresponding to the first checkpoint;
      determine, responsive to the determination that the mobile device has reached the first checkpoint, a second checkpoint of the plurality of checkpoints of the facility to send the user based on a random selection of a particular checkpoint from a subset of the plurality of checkpoints; and communicate an indication of the second checkpoint to the mobile device and an indication of a time period allowed for the user to reach the second checkpoint from the first checkpoint.

12. A method for checkpoint-based location monitoring via a mobile device, comprising:

determining a checkpoint for a user of a facility to reach and a time period allowed for the user to reach the checkpoint;

communicating the determined checkpoint and the determined time period allowed to a mobile device associated with the user;

receiving an indication that the user reached the checkpoint within the time period based on a communication between the mobile device and a wireless beacon associated with the checkpoint;

responsive to receiving the indication, determining an additional checkpoint for the user to reach from the checkpoint and an additional time period allowed for the user to reach the additional checkpoint from the checkpoint, wherein the additional checkpoint is determined based on a determined risk of intrusion into the facility proximal to the second checkpoint;

receiving a verification from the mobile device that the mobile device is possessed by the user; and communicating to the mobile device, upon receiving the verification, an identification of the additional checkpoint and the additional determined time period allowed for the user to reach the additional checkpoint from the checkpoint.

13. The method of claim 12, wherein the mobile device is a wearable device.

14. The method of claim 12, wherein the method includes providing a notification via the mobile device responsive to a determination that the determined time period allowed has fallen below a threshold.

15. The method of claim 14, wherein the notification is provided via a sound played by the mobile device.

16. The method of claim 14, wherein the notification is provided via a vibration pattern associated with the mobile device.

17. The method of claim 12, wherein the verification is at least one of:

a fingerprint verification;

a voice identification verification; and a password.

18. The method of claim 12, wherein the additional determined time period is different than a previous determined time period allowed for the user to reach the additional checkpoint from the checkpoint.

* * * * *